United States Patent [19]
Peterson

[11] 4,225,649
[45] Sep. 30, 1980

[54] FIRE RETARDANT COMPOSITION AND CABLES COATED THEREWITH

[75] Inventor: Roger L. Peterson, Los Angeles, Calif.

[73] Assignee: The Flamemaster Corporation, Sun Valley, Calif.

[21] Appl. No.: 946,174

[22] Filed: Sep. 27, 1978

Related U.S. Application Data

[63] Continuation-in-part of Ser. No. 842,267, Oct. 14, 1977, abandoned.

[51] Int. Cl.² .......................... B32B 15/08; C09K 3/28
[52] U.S. Cl. ........................ 428/383; 174/110 AR; 174/110 SR; 174/120 AR; 174/120 SR; 252/8.1; 428/372; 428/384; 428/389; 428/390
[58] Field of Search .................. 174/110 AR, 110 SR, 174/120 AR, 120 SR; 252/8.1; 428/375, 379, 389, 372, 383, 384, 390

[56] References Cited

U.S. PATENT DOCUMENTS

| | | | |
|---|---|---|---|
| 2,938,937 | 5/1960 | Shenk | 260/736 |
| 3,738,866 | 6/1973 | Martens | 428/379 |
| 4,018,983 | 4/1977 | Pedlow | 252/8.1 |
| 4,022,945 | 5/1977 | Mackenzie, Jr. et al. | 174/110 SR |
| 4,038,237 | 7/1977 | Snyder | 252/8.1 |
| 4,105,825 | 8/1978 | Heath et al. | 428/379 |
| 4,145,475 | 3/1979 | Vostovich | 428/379 |
| 4,154,892 | 5/1979 | Glatti et al. | 174/110 SR |

FOREIGN PATENT DOCUMENTS

1015353 12/1965 United Kingdom .
1297710 11/1972 United Kingdom .
1418121 12/1975 United Kingdom .
1445939  8/1976 United Kingdom .
1475554  6/1977 United Kingdom .

*Primary Examiner*—Leland A. Sebastian
*Attorney, Agent, or Firm*—Lyon & Lyon

[57] ABSTRACT

A self-extinguishing fire-protective composition is disclosed. The composition includes a water-based resinous emulsion, organically bound halogen, clay and a low temperature fiber such as glass or organic fibers.

27 Claims, 3 Drawing Figures

U.S. Patent    Sep. 30, 1980    4,225,649
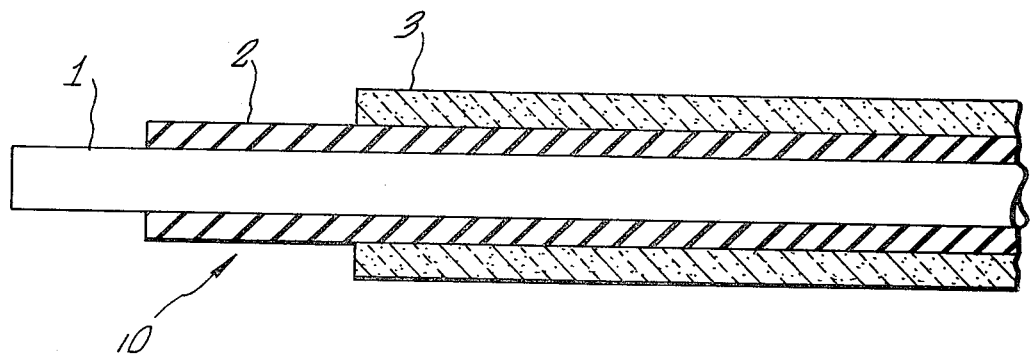
FIG. 1
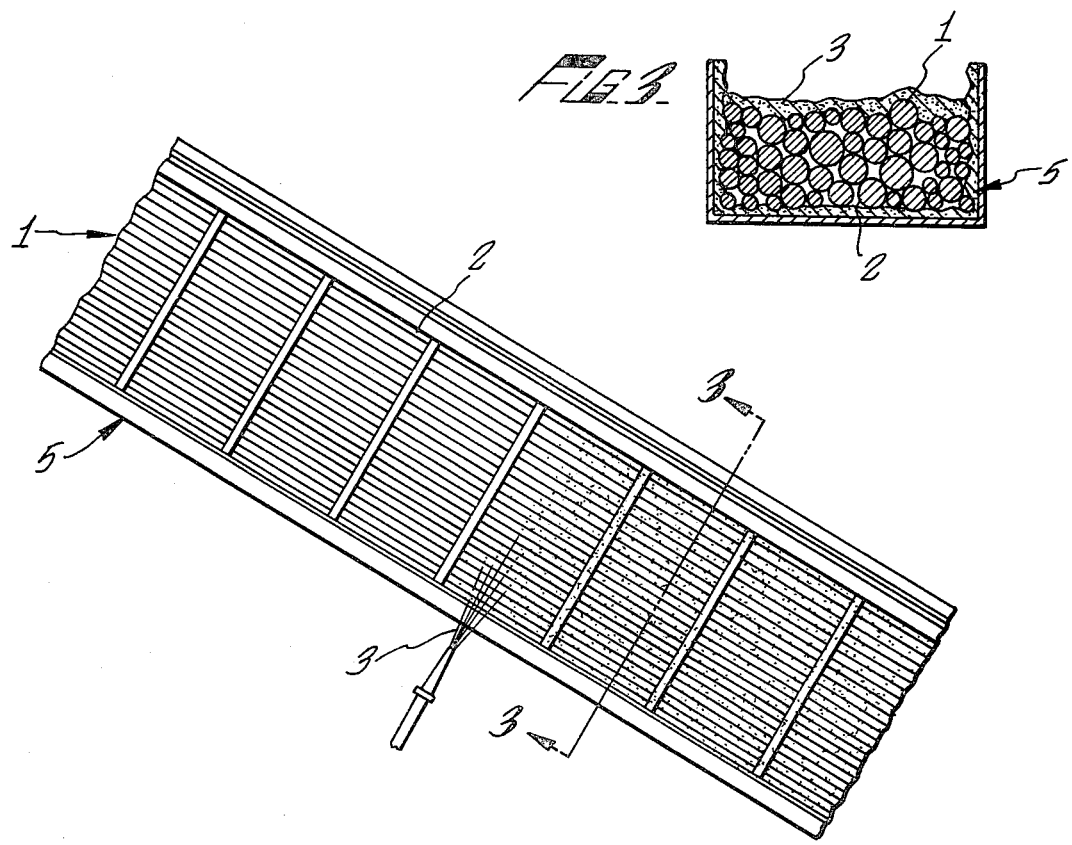
FIG. 3
FIG. 2

FIRE RETARDANT COMPOSITION AND CABLES COATED THEREWITH

This application is a continuation-in-part of Ser. No. 842,267, filed Oct. 14, 1977, now abandoned entitled, "Fire Retardant Composition."

BACKGROUND OF THE INVENTION

Asbestos, its incombustibility revered for centuries, was originally employed during the Stone Age as an additive to pottery. Later, the ancients, preparing for the king's cremation, frequently draped their rulers in funerary garments woven from this amazing fiber. During the Middle Ages, charlatans and magicians dazzled the peasantry with asbestos cloths that refused to burn. It wasn't until the late 19th Century, however, that asbestos received widespread industrial application. Today, the myriad of products containing this mineral are so numerous that they defy cataloging.

Unfortunately, asbestos is not without deleterious side effects. As early as two thousand years ago, the Greek geographer, Strabo, and the Roman naturalist, Pliny the Elder, described a sickness of the lungs found in slaves who wove asbestos into cloth and postulated that the adverse biological consequences evidenced by such slaves stemmed from their contact with this mineral. Outside of this passing reference to the disease, the effects of the lengthy exposure to this mineral went unnoticed. As asbestos became more prevalent, however, mysterious deaths and debilitating lung diseases were discovered in many workers. Originally attributed to ordinary dust and the poor ventilation of the factories, these infirmities were quickly ascribed to asbestos. This disease, entitled asbestosis, was later found to be a form of pneumoconiosis, a general term for all dust diseases of the lungs, and is characterized by pulmonary fibrosis.

While asbestos has been recognized as a serious health problem to workers in the field for at least 50 years, the voracious appetite for this material and the absence of adequate substitutes prevented its ban. Within the past few years though, the public's concern over its potential health hazards has reached a zenith. This interest stems in part from the widespread use of this material which brings nearly everyone within its spector. This, coupled with an understandable fear that one may be subjected to the fibers while unaware and will be unable to take necessary precautions, has aroused the public. Particularly frightening is a peculiar characteristic of this mineral. Because of its virtual indestructability, once inhaled, asbestos continues to react with the lungs for a lifetime. Recently, the medical profession has also noted a correlation between asbestos exposure and an increased incidence of cancer. Contact with asbestos has been found to cause, inter alia, mesothelioma, a frequently malignant tumor of the pleura. The potency of asbestos is so great that even those whose exposure to the material is minimal still suffer a risk of being stricken. The by-product of this concern, increasingly stringent controls placed on the use of asbestos, has triggered a quest for suitable substitutes embodying the beneficial aspects of resistance to heat, flexibility, and availability, without concomitant health problems. This search for replacements that have the diversity of functions found with asbestos has heretofore been unsuccessful.

In one particular industrial area, the use of asbestos was deemed particularly critical. Utility companies and other major industrial plants frequently have a series of high temperature conduits such as electric cables, control cables and pneumatic lines in close proximity. In utility companies large numbers of high voltage electric cables are separated by only a short distance. Because high voltages traverse these cables, they frequently operate at very high temperatures. Also, if one cable should ignite, the close proximity of the other cables presages a blazing inferno that quickly jumps from cable to cable, each cable in turn fueling the spreading conflagration.

A similar problem is found in many other industries, oil refineries for instance. There, control cables and pneumatic lines are subject to fires, and economic considerations often dictate that these conduits be close together as in the case of utility cables. Thus the need for a fire retardant composition.

While it is virtually impossible, in light of today's technology, to completely eliminate the prospect of a fire, it has been found that when a fire does break out, the damage can be minimized if the plant is quickly shut down, thereby preventing further fuel from reaching the flames. In a utility, termination of the electric current quickly lowers the temperature of the cables below the critical temperature and the fire can be extinguished at its inception. Critical to this method is prompt discovery of the blaze while it is still in its formative stages and a means of preventing the fire from spreading from its place of origin. One means of ensuring a small fire is to coat the cable with a flame-retardant composition that will prevent the spread of the flames. This enables plant operators to shut down operations before the fire rampages.

These compositions have frequently contained asbestos as one of the primary flame retardant constituents. This was primarily due to its widespread acceptance under nearly all building codes, its low cost, and its ease of application. While other compositions were not unknown, they frequently lacked the flexibility, acceptance, and low cost attendant to asbestos. Successful compositions employing other materials in addition to asbestos are disclosed in U.S. Pat. No. 3,642,531, U.S. Pat. No. 3,928,210 and U.S. patent application Ser. No. 687,345, now U.S. Pat. No. 4,064,359, the disclosures of which are incorporated by reference. While these compositions are in the form of an emulsion or mastic and thus do not have the free asbestos fibers that are presently the subject of debate by health authorities, nevertheless the regulatory climate throughout the world is such that use of the mineral is likely to be barred within a relatively short period of time irrespective of the form in which it is used.

The patents noted above disclose self-extinguishing fire protective compositions containing, inter alia, asbestos or other non-combustible fibers. An important characteristic of such fibers, however, is that they have high temperature resistance. Fibers having high temperature resistance are considerably more expensive than asbestos, however, and a manufacturer unconcerned about the deleterious effects of this substance has little incentive to employ these other fibers. Furthermore, many of these fibers lack the flexibility of asbestos as well as its high heat emissivity properties. Consequently, there is needed a fire retardant composition that embodies the beneficial attributes obtained with asbestos, including low costs, ease of application, flexibility, etc., but which does not contain asbestos and hence is totally free from concern as to any possible deleterious consequences.

SUMMARY OF THE INVENTION

The present invention provides a fire protective composition which, upon application, forms a self-extinguishing fire barrier and does not significantly retain heat under normal operating conditions. This composition achieves these desirable results without employing asbestos and yet embodies the beneficial properties achieved when using such material. These compositions include a water-based resinous emulsion, a compound which serves as a source of organically bound halogen, clay and a low temperature fiber such as glass or organic fibers.

A principal object of this invention is the provision of a fire protective composition which does not contain asbestos but is still highly effective in preventing propagation of a fire and the spreading of flames when applied to combustible substrates.

Another object of this invention is to provide a fire protective composition without the use of asbestos that is still capable of being formed into a flexible coating which permits the cable to be easily handled and which may conveniently be removed therefrom.

A still further object of this invention is to provide a fire protective composition that minimizes potentially toxic ingredients.

Other objects, features, and advantages of this invention will be apparent to those skilled in the art upon reading the following, more detailed description.

BRIEF DESCRIPTION OF THE DRAWINGS

FIG. 1 shows a cut-away view of an electric cable protected with a composition according to this invention.

FIG. 2 shows the configuration of electric cables as they often appear in an industrial application.

FIG. 3 is a cut-away view of the cable tray having a plurality of cables of FIG. 2 taken along lines 3—3.

DETAILED DESCRIPTION OF THE INVENTION

The water-based resinous emulsion is preferably a thermoplastic such as polyvinyl acetate emulsion, GRS rubber, a natural rubber latex, methacrylate and acrylate resins and copolymers, elastomeric polyurethanes, polyvinyl and polyvinylidene chloride and copolymers. Copolymers of such materials as vinyl acetate and vinyl chloride, polyvinyl acetate and ethylene may also be employed. However, it is often desirable to minimize the use of chlorinated hydrocarbons because of their potential harmful effects on the environment. Water emulsified epoxy resins may also be used, as can polystyrene and acrylonytrile-butadiene-styrene polymers. The composition must have sufficient resinous emulsion to produce a coherent plastic film or coating when the composition is applied to electrical cables and also one which adheres well to the surface of cable insulation but which can be easily removed if desired. Accordingly, although the quantity of resinous emulsion solids and other ingredients will vary somewhat, as explained in more detail hereinafter, at least about 1.5 weight percent of resinous emulsion solids, preferably at least about 4 percent, will be used, based on the total weight of the composition as manufactured. In general, the quantity of resinous emulsion solids will be kept relatively low, with sufficient resin being used to provide satisfactory physical properties and a coating which is tough and sufficiently flexible to permit easy handling of coated cables and which contains as little combustible material as possible. Normally, the resinous emulsion solids should not exceed approximately 35 to about 40 weight percent with about 25 weight percent being a generally preferred maximum due to economic considerations, although in some instances, up to approximately 50 weight percent is feasible.

The compound which is the source of the organically bound halogen is preferably a brominated hydrocarbon such as decabromo-diphenyl oxide although other halogenated hydrocarbons, such as chlorinated paraffin, or mixtures thereof are satisfactory and may also be employed. Brominated hydrocarbons are preferred because they are more effective fire retardants by weight. Decabromo-diphenyl oxide is desirable because it has been extensively tested and at the present time has posed no environmental or health problems in its use. Examples of other suitable materials are halogenated hydrocarbons, particularly chlorinated and brominated hydrocarbons being generally preferred because of economic considerations. Examples of such halogenated hydrocarbons include chlorinated paraffin, such as that available from Diamond Shamrock Corporation under the tradename designation "Chlorowax 70" which contains from 68 to 78 weight percent chlorine, chlorinated napthalene, chlorinated terphenyl, mixtures of such materials, hexabromocyclodecane, tribromobenzene, polytetrafluoroethylene, chlorotrifluoroethylene, and perchloropentacyclodecane. Other compounds which are suitable sources of organically bound halogen may also be used, such as tetrabromophthalic anhydride and tris beta chloroethyl phosphate. Also, if polyvinyl chloride or polyvinylidene chloride is used as the resinous emulsion, such material, of course, likewise serves as a suitable source of organically bound halogen in the composition, thereby making it unnecessary to include a second such material. In such case, the quantity of resinous emulsion may be increased an appropriate amount to compensate for this. For example, if the composition normally contained 35 weight percent resin emulsion and 5 percent halogen, 40 percent resinous emulsion could be used, although it will generally be unnecessary to do so. From about 0.5 percent to about 20 percent by weight halogen containing compound ordinarily will be used, with the preferred range being from about 1 to about 5 weight percent, based on the total weight of the composition as manufactured, except where the resinous emulsion is halogenated, in which case the amount of halogen containing compound could be as much as 70 weight percent of the composition, i.e., the sum of the resinous emulsion and halogen containing compound.

Preferably, the composition includes a plasticizer to provide flexibility for the coating, although in some emulsions, such as elastomeric polyurethanes and rubbers, it may not be necessary to use a plasticizer. If one is used, the selection of a particular plasticizer, of course, depends upon the particular emulsion chosen, with suitable plasticizers being those generally used to plasticize such emulsions. A particularly suitable plasticizer is a chlorinated hydrocarbon sold under the trademark "Chlorowax 500", which has also been found to satisfy environmental concerns. This chlorinated material shows excellent fire protective and plasticizing properties and presumably does not have the potential toxicity problems associated with halogenated phosphate plasticizers. Normally, the quantity of plasticizer will be relatively small, within the range of from about 1 to about 7.5 weight percent based on the total weight of the manufactured composition.

Clays such as hydrated aluminum silicates and alkali metal aluminosilicates, which are also called fluxing materials, may be employed either alone or in combination. These clays include, for example, Kaolin, ball, fire and other well known clays, and the fluxing minerals include, for example, feldspar. It has been found that a mixture of Kingman Feldspar and Tennessee #1 Ball Clay produces satisfactory coatings. Hydrated clays produce superior results in terms of thermal conductivity as compared to calcinated clays and should be used whenever possible. The clay or fluxing material should be present in a range of about 5 weight percent to about 70 weight percent with a preferred range of about 10 to about 30 weight percent. While some clay is essential to the composition, the upper limit is primarily dictated by practical considerations such as the ability to mix the material. The unexpected results achieved with the composition of this invention are believed to stem, at least in part, from the use of clay instead of asbestos and are due to the ability of the clay to function essentially as a binder to hold the composition together as it melts or softens in a fire.

The fibers are low-temperature fibers in contrast to well known high-temperature fibers such as asbestos, quartz or ceramic fibers. The term low-temperature fiber refers to fibers that decompose, melt or lose their structural integrity as opposed to fibers that retain their reinforcing properties at typical fire temperatures, i.e., temperatures of about 1250° F. to about 1800° F. If glass is used, it may be milled glass fibers made from E glass having a range from about 1/32" to about ½" in length. Other fibers such as nylon, Orlon (acrylic), polyesters, cellulose and other organic fibers may also be employed. It is preferable that the fibers chosen not be highly flammable although this characteristic may be compensated for by increasing the amount of fire retardant additives. The total quantity of low-temperature fibers which may be included in the composition as manufactured may vary over a considerable range, as for example, from about 1.5 to about 70 weight percent. In general, if a composition is desired which will provide a coating having greater reinforcement capability, larger quantities of fiber will be used.

It has been found that this fire retardant composition eliminates the need for asbestos and other high-temperature fibers and yet still achieves the same and in some instances far superior end results. For example, even though asbestos is absent, the fire retardant composition does not reduce ampacity, i.e., the current carrying capacity of the cable, as shown by the Example, in coated cables to the extent traditional coatings have. Furthermore, it also produces a coating that remains after the organic material has burned off.

While the exact mechanism of operation is not known, it is postulated that the clay melts at the elevated operating temperatures and binds the inorganic residue of the coating materials together while simultaneously preventing the resultant film from being displaced from the cable insulation which it protects, as opposed to the fusion of glass fibers taught in U.S. Pat. No. 3,551,276. Thus, the integrity of the coating is maintained.

The fire protective composition preferably includes an antimony-containing compound, such as antimony oxide. In general, about 0.5 to about 20 weight percent of the antimony will be used with the preferred range being from about 2 to about 5 weight percent. It is postulated that the antimony oxide functions in combination with the organic halogen during burning by interfering with the normal combustion process, or to limit burning, possibly by reacting with the halogen, to form a heavy gas which forms at the boundary of the burning surface and thus prevents oxygen from reaching the flames.

Various inert inorganic fillers such as calcium carbonate or silica or other such stable inorganic materials may also be present in the fire protective composition. These fillers will normally be present in a range of approximately 5 to about 40 weight percent, based on the total weight of the composition as manufactured. Similarly, aesthetic considerations may dictate a desired color. In that event, the composition may also include organic or inorganic pigments such as titanium dioxide, ferric oxide, etc., to impart the desired tint. Naturally, the quantity of such pigment will be relatively small, generally no more than approximately 4 weight percent. By the same token, additives such as hydrated alumina may be used which contain chemically bound water of hydration that will be liberated when the coating is exposed to a fire and functions to reduce the heat transferred to the protected substrate in the early stages of a fire. Ordinarily, approximately 5 to 15 weight percent of such additives may be used, based on the weight of the total composition as manufactured, although, higher quantities may be used if desired.

Referring now to the drawings, an electrical cable 10 is illustrated in FIG. 1 having a metallic core 1, insulation 2 and a coating 3 of a fire-protective composition on its exterior. The insulation may be comprised of any of the well known material including neoprene rubber, butyl rubber, and cross-linked polyethylene. In addition to the insulation layer 2, there may be additional layers of material on the cable such as an extruded jacket (not shown) to prevent cutting the insulation 2. A series of these cables 10 in close proximity as found, for example, in the utility operation is shown in FIG. 2. There, a plurality of cables 10 are supported by a tray 5 and the insulation 2 of the cables 10 is being sprayed with the fire-retardant composition 3. FIG. 3 exhibits a cut-away view of the cable tray 5 of FIG. 2 along the axis 3—3 showing the configuration of a plurality of cables 10 with the composition 3 of this invention on the exterior surface of the grouped cables 10.

The composition may be applied as a fluid or as a mastic by various methods, including spraying, brushing, trowelling, gunning, etc. Depending upon the form of the composition, the composition will contain the requisite amount of water, slightly greater quantities of water being required if a sprayable composition is to be produced. In general, the percent of total solids of the composition may vary from approximately 25 percent solids up to approximately 90 percent. For reasons of performance and economy, the generally preferred range will be from about 45 percent to about 80 percent by weights of total solids, based on the total weight of the composition as manufactured.

The composition may also contain minor amounts of various additives to stabilize and protect the emulsion, such as wetting agents, defoaming agents, fungicides, etc. The quantity of such ingredients will usually be within the range of from about 1 to about 5 percent by weight.

It is advisable to clean the surface to which the coating is to be applied if it contains excessive oil or grease contamination. The surface should also be free of excess loose dirt and dust. When the composition is applied to electrical cables, the coating should be approximately ⅛ inch in thickness. To attain such a coating, the initial thickness should be approximately ¼ inch when the wet composition is applied as it will shrink approximately 45 percent in drying. If the fire hazard is minimal, the thickness of the coating may be only approximately 1/16 inch, and conversely, if a strong fire hazard exists, the coating may be approximately ¼ inch thick. Depending upon the thickness applied and the atmosphere conditions, the composition will usually dry to touch between 1 and 2 hours, and after approximately 24 hours, the cable may be handled or removed. Complete drying requires up to approximately 3 days, and consequently, fire testing should not take place until at least 3 days after application since traces of moisture left on the inside of the coating could expand and loosen adhesion.

After drying, the water, of course, will have evaporated and the resulting dried coating, in one formulation, where the total solids content of the liquid composition was approximately 70 weight percent, will comprise the following materials in the indicated approximate percentages:

| | |
|---|---|
| Resin solids | 25.5 wt. % |
| Chlorinated hydrocarbon | 4.4 wt. % |
| Plasticizer | 4.8 wt. % |
| Low Temp. fibers | 7.6 wt. % |
| Fillers and Fire Retardant Additives | 17.0 wt. % |
| Antimony compound | 6.7 wt. % |
| Clay | 19.0 wt. % |
| Hydrated Alumina | 14.0 wt. % |
| Process Additives | 1.0 wt. % |

The percent of the various ingredients in the dried coating will vary, of course, depending upon the resinous emulsion, plasticizer, fillers, and fibers used, which in turn depends upon the intended use of the composition and economic and performance requirements, as explained above. In general, the dried coating will contain, based on the total weight of the coating, from about 2 to about 90 weight percent resin solids from the emulsion, with from about 5 to about 60 weight percent being generally preferred, about 0.75 to about 30 weight percent of the organically bound halogen, from about 2 to about 90 weight percent low temperature fibers, and from about 7 to about 90 weight percent clay. If a plasticizer is used, the dried coating will normally contain from about 1.5 to about 10 weight percent of the plasticizer. Similarly, if hydrated alumina is included, about 10 to approximately 35 weight percent may be used, and if inorganic fillers, pigments, wetting agents, etc., or an antimony compound is used, the dried coating will contain from about 6.5 to about 55 percent and from 7 to about 30 weight percent, respectively, of such materials.

It will be readily apparent to those skilled in the art that the ratio of the non-volatile components is the same in the dried film as in the wet composition, and accordingly, such persons will experience no difficulty in ascertaining the appropriate composition for use in a given situation.

The invention will be better understood by reference to the following specific but illustrative example.

EXAMPLE

TABLE 1

| | POUNDS | MATERIAL |
|---|---|---|
| A. | 35 | H₂O |
| B. | 1 | Hydroxy Methyl Cellulose |
| C. | 1 | Fungicide |
| D. | 1 | Surface Active Agent (dispersing aide) |
| E. | 15 | Titanium Dioxide |
| F. | 35 | Antimony Oxide |
| G. | 70 | H₂O |
| H. | 23 | Decabromo Diphenyloxide |
| I. | 35 | Zinc Borate |
| J. | 50 | Feldspar |
| K. | 50 | Tennessee Ball Clay |
| L. | 50 | Hydrated Alumina Medium Particle Size |
| M. | 25 | Hydrated Alumina Small Particle Size |
| N. | 50 | Calcium Carbonate |
| O. | 30 | ¼" Milled Glass Fibers |
| P. | 10 | 1/32" Milled Glass Fibers |
| Q. | 225 | Ethylene/Polyvinyl Acetate Copolymer Emulsion (55 weight percent solids) |
| R. | 25 | Chlorinated Hydrocarbon (Chlorowax 500) |
| S. | 0.8 | Bubble Breaker |

Total Solids Content - Approximately 70 Weight Percent.

Using the general procedure previously described, raw materials (see table 1) B., C., and D. are dissolved in water (A). The powdered ingredients E., F., H., I., J., K., L., M., and N. are well dispersed in A with additional water (G) added as necessary to allow good dispersion. Some emulsion (Q) is added to allow all the powders to be stirred in. When all of the powders have been dispersed as a smooth paste, the rest of the emulsion is added. The plasticizer (R) is then stirred in. The glass fibers O & P are then added carefully with relatively slow agitation to prevent breaking the fibers. When these are completely dispersed, the bubble breaker (S) is stirred in.

After the composition is prepared as above, it is applied by spraying with standard spray coating apparatus to an 8 foot horizontal cable tray containing approximately 20 insulated electrical cables. The coating is applied to one-half of the cable tray, top and bottom, to provide approximately one-eighth inch thickness of coating. The remainder of the cable tray and cables were not coated. The fire protective coating is permitted to dry for 2 days and the test rig is then positioned in a wind protected area so that wind direction does not influence the results. Burlap bags soaked in transformer oil are then wrapped around the cables and ignited with a propane blow torch. The burning time of the heat source is approximately 6 minutes on the section of the tray which had been coated as described, after which the fire had burned out. On the uncoated cables, the fire does not burn out until the cable insulation (layer 2 in the drawings) has been totally decomposed and the metal cables charred and completely unusable. In contrast to this, the coated cables, after being permitted to cool, are inspected and found to be substantially unharmed and suitable for further use.

Tests have also been performed on electrical cables coated with the fire protective composition of this invention to determine whether the coating affects the current carrying capability of the cable, as determined by the temperature rise in the cable during operation. It has been found that such coating does not reduce significantly the ampacity, the reduction being generally on the order of only less than 1 percent, which is not sufficient to derate the cables, the temperature of the insulation on the cables increasing only approximately 2 percent with a ⅛ inch thickness coating of the fire protective composition.

In addition to the previously described qualities, the fire-protective composition of this invention is odorless and environmentally acceptable and has a Shore A hardness of up to about 85. An unsupported 1/16 inch thickness film passes a 1.8 inch mandrel bend per ASTM D 1737-62. A 1/16 inch film on aluminum is capable of withstanding an impact of at least 24 inches per pound on a Gardener Impact Tester.

Although the foregoing illustrative example could be duplicated herein utilizing the other ingredients previously mentioned and different ratios of the same, the invention is amply demonstrated by the foregoing. Accordingly, for the sake of brevity of disclosure, further illustrative examples will not be set forth herein.

As will be appreciated from the foregoing, the fire-protective composition of this invention, is very effective in protecting electric cables and other substrates from the destruction effects of fires. Also, the coating provided by such composition is flexible and does not interfere in any way with the normal use of the installed cables. Additionally, the composition does not cause a significant temperature increase in the cables during operation, will be stable as a coating agent over long periods of time, and the coating does not significantly reduce the ampacity.

While embodiments and applications of this invention have been shown and described it would be apparent to those skilled in the art that many more modifications are possible without departing from the inventive concepts herein described. The invention, therefore, is not to be restricted except by the spirit of the appended claims.

What I claim is:

1. A self-extinguishing fire-protective composition which comprises an aqueous emulsion containing from about 25 to about 90 weight percent total solids and comprising from about 1.5 to about 50 weight percent of water-emulsified resin solids, about 0.5 to about 20 weight percent of a halogen containing organic compound, about 1.5 to about 70 weight percent low temperature fibers, and about 5 to 70 weight percent clay.

2. The composition of claim 1 in which said water-emulsified resin is selected from the group consisting of polyvinyl acetate, polyvinyl acetate copolymers, and acrylic resins.

3. The composition of claim 1 in which said fibers include based on the total weight of the fibers, about 20 to about 80 weight percent of relatively short fibers having a maximum length of approximately one thirty-seconds inch with the remainder of said fibers having a maximum length of about one-half inch.

4. The composition of claim 1 wherein said halogen compound is decabromo-diphenyl oxide.

5. The composition of claim 1 in which said composition includes approximately 0.5 to about 20 weight percent of an antimony-containing compound.

6. The composition of claim 1 wherein said composition includes approximately 1 to about 7.5 weight percent of a plasticizer for said water-emulsified resin.

7. The composition of claim 1 wherein said plasticizer is a chlorinated hydrocarbon.

8. The composition of claim 1 in which said composition includes about 5 to about 40 weight percent wetting agents and inert materials consisting of inorganic fillers and coloring agents.

9. The composition of claim 1 in which said resin is selected from the group consisting of polyvinyl acetate, copolymers of polyvinyl acetate and ethylene, GRS rubber, natural rubber latex, methacrylates, acrylates, elastomeric polyurethanes and epoxy resins.

10. The composition of claim 1 wherein said low-temperature fibers are capable of losing their structural integrity and reinforcing properties at typical fire temperatures and are selected from the group consisting of organic and glass fibers.

11. The composition of claim 10 wherein said organic fibers are selected from the group consisting of nylon, acrylic, polyester, cellulose and mixtures thereof.

12. An electrical cable comprising an internal metal core, a layer of insulation surrounding said core, and a self-extinguishing fire-protective coating about said layer of insulation, said coating being the dried residue of an aqueous emulsion and comprising from about 2 to about 90 weight percent of water-emulsified resin solids, about 0.75 to about 30 weight percent of a compound containing organically bound halogen, about 2 to about 90 weight percent low temperature fibers and about 7 to about 90 weight percent clay.

13. The cable of claim 12 in which said water-emulsified resin is selected from the group consisting of polyvinyl acetate, polyvinyl acetate copolymers and acrylic resins.

14. The cable of claim 12 in which said fibers include based on the total weight of the fibers, about 20 to about 80 weight percent of relatively short fibers having a maximum length of approximately one thirty-seconds inch with the remainder of said fibers having a maximum length of about one-half inch.

15. The cable of claim 12 wherein said halogen compound is decabromo-diphenyl oxide.

16. The cable of claim 12 in which said dried residue includes approximately 0.7 to about 30 weight percent of an antimony-containing compound.

17. The cable of claim 12 wherein said dried residue includes approximately 1.5 to about 10 weight percent of a plasticizer for said water-emulsified resin.

18. The cable of claim 12 in which said layer of insulation is selected from the group consisting of neoprene rubber, butyl rubber, and crosslinked polyethylene.

19. The cable of claim 12 in which said dried residue includes about 10 to 35 weight percent hydrated alumina.

20. The cable of claim 12 in which said resin is selected from the group consisting of polyvinyl acetate, GRS rubber, a polyvinyl acetate/ethylene copolymer, natural rubber latex, methacrylates, acrylates, elastomeric polyurethanes and epoxy resins.

21. The cable of claim 12 wherein said low-temperature fiber is capable of losing its structural integrity instead of charring at typical fire temperatures and is selected from the group consisting of organic and glass fibers.

22. The cable of claim 21 wherein said organic fibers are selected from the group consisting of nylon, acrylic, polyester, cellulose and mixtures thereof.

23. A tray of cables coated with a self-extinguishing fire-protective composition which comprises the dried residue of an aqueous emulsion and comprising from about 2 to about 90 weight percent of water-emulsified resin solids, about 0.75 to about 30 weight percent of a halogen-containing hydrocarbon compound, about 2 to about 90 weight percent low temperature fibers, and about 7 to about 90 weight percent clay.

24. The composition of claim 1 in which said clay is selected from the group consisting of hydrated aluminum silicates and alkali metal aluminosilicates.

25. The composition of claim 24 in which said clay is a mixture of Kingman Feldspar and Tennessee #1 Ball Clay.

26. The composition of claim 1 in which said composition includes about 5 to about 15 weight percent hydrated alumina.

27. A self-extinguishing fire-protective composition comprising an aqueous emulsion containing from about 45 to 80 percent by weight total solids and comprising about 1.5 to about 40 weight percent water-emulsified resin solids from the groups consisting of polyvinyl acetate, polyvinyl acetate copolymers and acrylic resins, about 0.5 to about 20 weight percent of a halogen containing organic compound, about 5 to about 70 weight percent of a clay selected from the group consisting of hydrated aluminum silicates and alkali metal aluminosilicates, and about 1.5 to about 70 weight percent low temperature fibers selected from the group consisting of organic and glass fibers.

* * * * *